US009762504B1

(12) United States Patent
Foottit et al.

(10) Patent No.: US 9,762,504 B1
(45) Date of Patent: Sep. 12, 2017

(54) SYSTEM, METHOD, AND COMPUTER PROGRAM FOR MANAGING A SHARED QUOTA FOR A PLURALITY OF NETWORK SUBSCRIBERS IN A CONSUMER TELECOMMUNICATIONS NETWORK

(71) Applicant: Amdocs Software Systems Limited, Dublin (IE)

(72) Inventors: Thomas Alexander Foottit, Stittsville (CA); Yong Li, Kanata (CA); Elizabeth Janet Keddy, Ottawa (CA)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 248 days.

(21) Appl. No.: 14/207,211

(22) Filed: Mar. 12, 2014

Related U.S. Application Data

(60) Provisional application No. 61/807,793, filed on Apr. 3, 2013.

(51) Int. Cl.
| | |
|---|---|
| G06F 15/173 | (2006.01) |
| H04L 12/911 | (2013.01) |
| H04M 15/00 | (2006.01) |
| H04L 12/14 | (2006.01) |
| H04W 4/24 | (2009.01) |
| H04M 15/16 | (2006.01) |

(52) U.S. Cl.
CPC ............. *H04L 47/70* (2013.01); *H04L 12/14* (2013.01); *H04L 12/1403* (2013.01); *H04L 12/1482* (2013.01); *H04M 15/00* (2013.01); *H04M 15/16* (2013.01); *H04W 4/24* (2013.01)

(58) Field of Classification Search
CPC ...... H04L 12/14; H04L 12/1403; H04W 4/24; H04M 15/66; H04M 15/00
USPC ......................................................... 709/226
See application file for complete search history.

(56) References Cited

U.S. PATENT DOCUMENTS

| | | | |
|---|---|---|---|
| RE39,135 E * | 6/2006 | Riddle | H04L 29/06 709/204 |
| 8,688,825 B1 * | 4/2014 | Shani | G06Q 30/00 709/223 |
| 2003/0236781 A1 | 12/2003 | Lei et al. | |
| 2005/0176465 A1 | 8/2005 | Fornell | |

(Continued)

OTHER PUBLICATIONS

Non-Final Office Action from U.S Appl. No. 14/207,238, dated Dec. 17, 2015.

(Continued)

Primary Examiner — Joseph Greene
(74) Attorney, Agent, or Firm — Zilka-Kotab, PC

(57) ABSTRACT

A system, method, and computer program product are provided for managing a shared quota for a plurality of network subscribers in a consumer telecommunications network. In use, a first usage quota reservation out of a shared quota is allocated to at least one first subscriber among a plurality of network subscribers. Further, it is determined that at least a portion of the shared quota is available. Additionally, a progressively smaller at least one second usage quota reservation out of the at least a portion of the shared quota is recursively allocated to the at least one first subscriber among the plurality of network subscribers, the smaller at least one second usage quota reservation being smaller than the first usage quota reservation out of the shared quota.

12 Claims, 5 Drawing Sheets

(56) References Cited

U.S. PATENT DOCUMENTS

| | | | |
|---|---|---|---|
| 2008/0104661 A1 | 5/2008 | Levin et al. | |
| 2009/0276386 A1* | 11/2009 | Greening | H04L 12/5695 706/47 |
| 2011/0055395 A1* | 3/2011 | Wang | H04L 47/783 709/226 |
| 2011/0149737 A1* | 6/2011 | Muthiah | G06F 9/5011 370/235 |
| 2012/0117235 A1* | 5/2012 | Castro Castro | H04L 12/14 709/224 |
| 2012/0173759 A1 | 7/2012 | Agarwal et al. | |
| 2014/0047181 A1 | 2/2014 | Peterson et al. | |
| 2014/0315536 A1 | 10/2014 | Chow et al. | |
| 2014/0378094 A1* | 12/2014 | Gillick | H04M 15/7652 455/406 |
| 2015/0105045 A1* | 4/2015 | Rolfe | H04M 15/765 455/406 |
| 2015/0249621 A1* | 9/2015 | Tian | H04L 47/822 709/226 |

OTHER PUBLICATIONS

Final Office Action from U.S. Appl. No. 14/207,238, dated Jul. 5, 2016.

Advisory Action from U.S. Appl. No. 14/207,238, dated Sep. 9, 2016.

Non-Final Office Action from U.S. Appl. No. 14/207,238, dated Dec. 29, 2016.

* cited by examiner

SYSTEM, METHOD, AND COMPUTER PROGRAM FOR MANAGING A SHARED QUOTA FOR A PLURALITY OF NETWORK SUBSCRIBERS IN A CONSUMER TELECOMMUNICATIONS NETWORK

CLAIM OF PRIORITY AND RELATED APPLICATIONS

This application claims the benefit of U.S. Provisional Application No. 61/807,793, filed Apr. 3, 2013, the entire contents of which are incorporated herein by reference. This application is related to U.S. Provisional Application No. 61/807,796, filed Apr. 3, 2013, and U.S. application Ser. No. 14/207,238, filed Mar. 12, 2014, the entire contents of which are incorporated herein by reference.

FIELD OF THE INVENTION

The present invention relates to telecommunications networks, and more particularly to sharing resources among users in such networks.

BACKGROUND

Often times, in telecommunications networks, a group of subscribers may be associated with a common subscription plan, which allows members of the group to share resources. For example, a company may have a group plan in which all employees associated with the company share a pool of available network resources. As another example, a family may have a group plan in which all family members are able to share a pool of resources.

Often times, in the context of sharing resources among members of the same plan, a fixed amount of data is repeatedly allocated to the members until the resources are exhausted. This technique has the potential to cause available resources to be exhausted prematurely, with some members having unused resources. There is thus a need for addressing these and/or other issues associated with the prior art.

SUMMARY

A system, method, and computer program product are provided for managing a shared quota for a plurality of network subscribers in a consumer telecommunications network. In use, a first usage quota reservation out of a shared quota is allocated to at least one first subscriber among a plurality of network subscribers. Further, it is determined that at least a portion of the shared quota is available. Additionally, a progressively smaller at least one second usage quota reservation out of the at least a portion of the shared quota is recursively allocated to the at least one first subscriber among the plurality of network subscribers, the smaller at least one second usage quota reservation being smaller than the first usage quota reservation out of the shared quota, and the recursive allocation functioning to allow a system to get as close as possible to an actual quota limit without going over the quota limit, without starving devices of quota, and minimizing an amount of signaling required.

DETAILED DESCRIPTION

Figure 1:
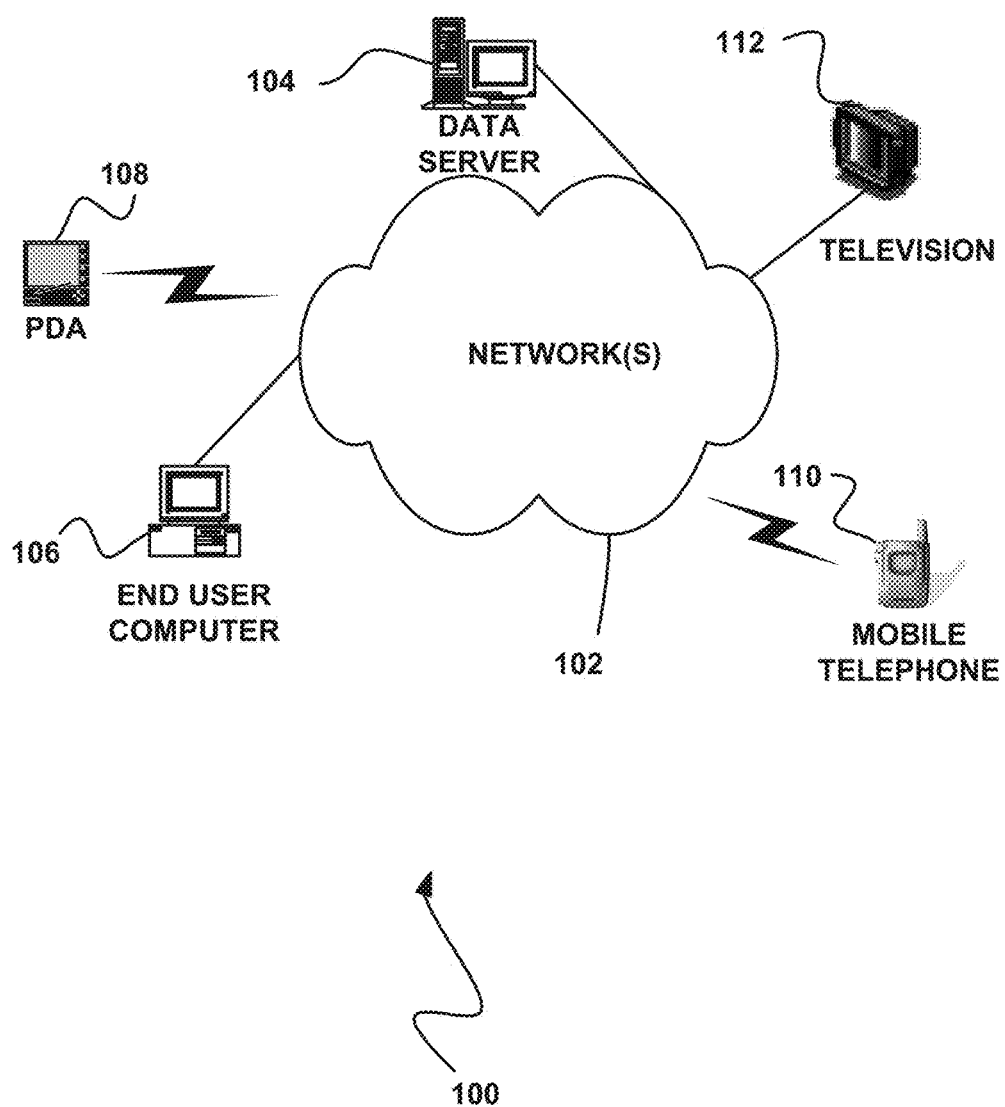
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
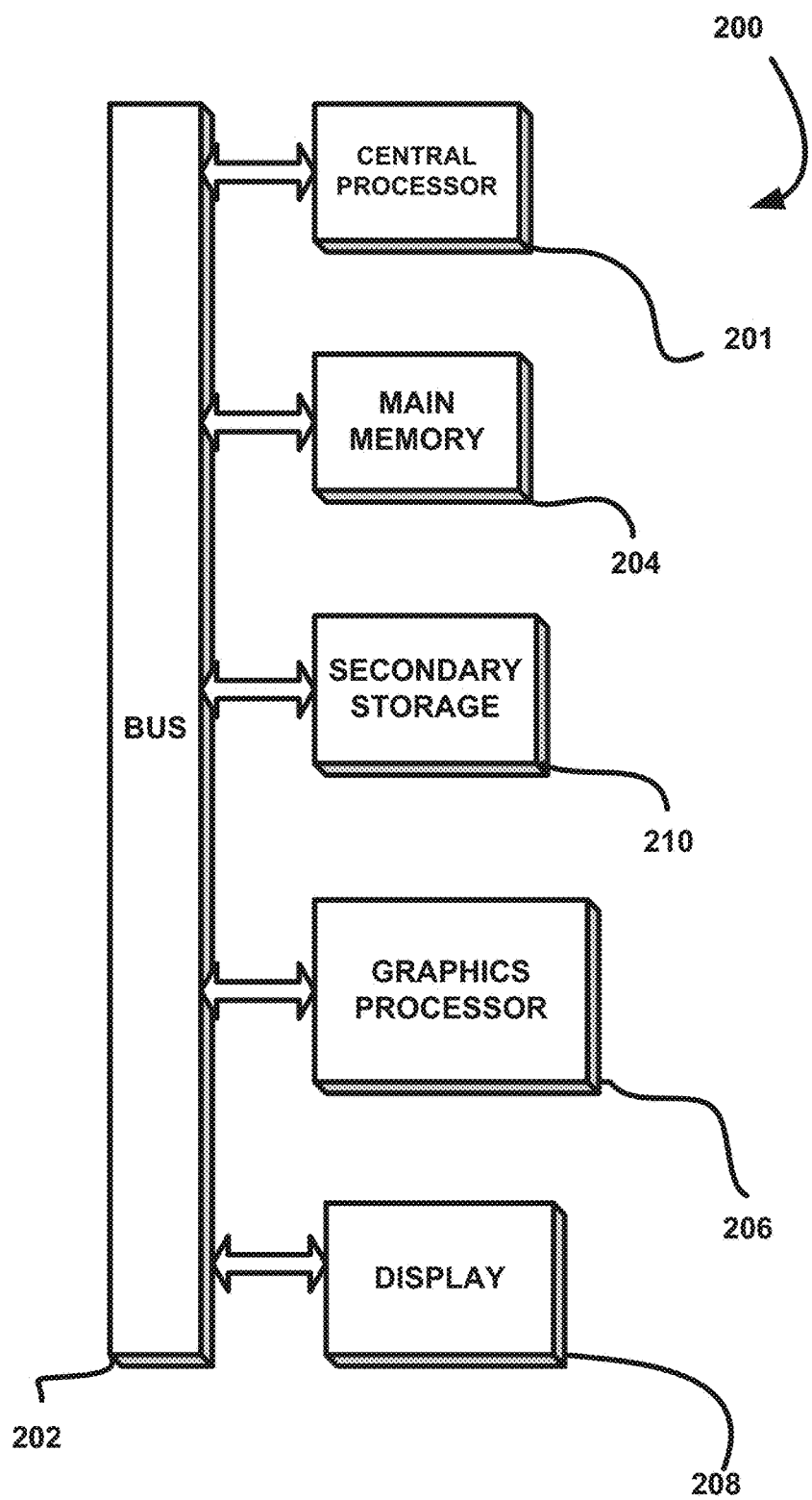
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
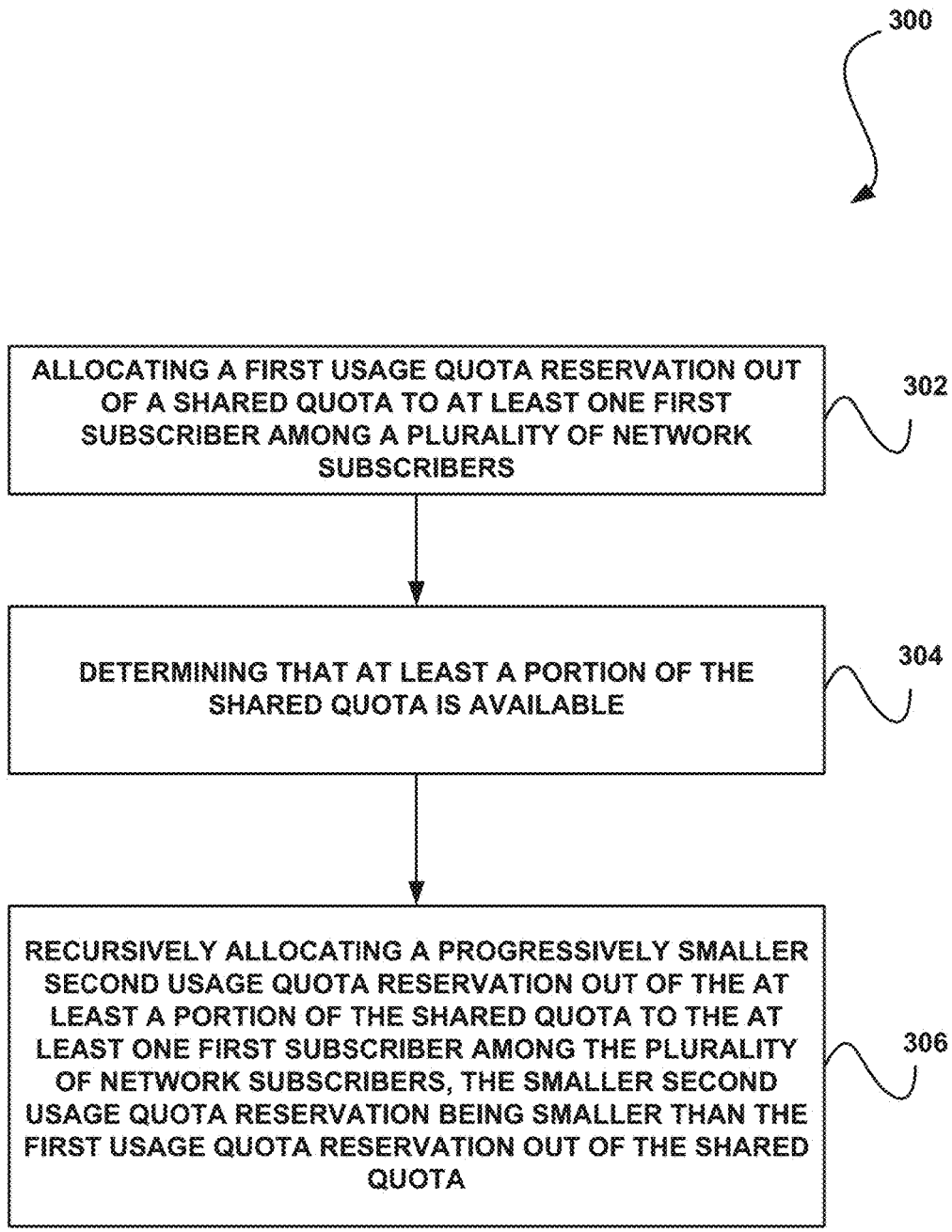
FIG. 3 illustrates a method for managing a shared quota for a plurality of network subscribers in a consumer telecommunications network, in accordance with one embodiment.

FIG. 3 illustrates a method 300 for managing a shared quota for a plurality of network subscribers in a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first usage quota reservation out of a shared quota is allocated to at least one first subscriber among a plurality of network subscribers. See operation 302. In one embodiment, the request for the first usage quota reservation may be received from a device associated with the first subscriber (e.g. a mobile phone, a table, etc.).

In the context of the present description, a shared quota refers to any amount of any type of resource that is reserved for, or allocated to, two or more users of telecommunications network. For example, in one embodiment, the shared quota may include an amount of data allocated to a plurality of subscribers, which the plurality of subscribers may all use. In this case, the data may include an amount of data the subscribers may transfer over a network (e.g. through network use, etc.).

As another example, the shared quota may include an amount of time allocated to a plurality of subscribers, which the plurality of subscribers may all use. In this case, the amount of time may include an amount of minutes available for calls and/or network usage, etc. As another example, the shared quota may include an amount of texts available. For example, the subscribers may be allocated a certain number of short messaging service (SMS) messages and/or multimedia messaging service (MMS) resources.

The first usage quota may include any resource amount of the shared quota that is reserved for, or allocated to, use by the at least one first subscriber. For example, in one embodiment, the first usage quota reservation may include a percentage of the shared quota. In another embodiment, the first usage quota reservation may include a fixed amount of the shared quota.

Further, the telecommunications network may include any type of network. For example, in one embodiment, the telecommunications network may include a Policy and Charging Rules Function (PCRF) based network. In the context of the present description, a PCRF-based network refers to any network including one or more components designated to determine policy rules in a multimedia network.

In another embodiment, the plurality of network subscribers may include subscribers to an Online Charging System (OCS) based network. In the context of the present description, an OCS-based network refers to any network including one or more components for allowing a communications service provider to charge their customers, in real time, based on service usage.

As shown further in FIG. 3, it is determined that at least a portion of the shared quota is available. See operation 304. Additionally, a progressively smaller at least one second usage quota reservation out of the at least a portion of the shared quota is recursively allocated to the at least one first subscriber among the plurality of network subscribers, the smaller at least one second usage quota reservation being smaller than the first usage quota reservation out of the shared quota (e.g. but not smaller than a smallest third usage quota reservation, in one embodiment). See operation 306.

In one embodiment, a request for the at least one second usage quota reservation may be received from the at least one first subscriber. For example, the first subscriber may have utilized all of the first usage quota reservation and may need more resources. Accordingly, a request for additional resources may be automatically sent to a system associated with the telecommunications network. The system may determine whether there are resources available from the shared quota. If there are resources available from the shared quota, a smaller at least one second usage quota reservation out of the at least a portion of the shared quota may be allocated to the at least one first subscriber.

Further, the first subscriber may utilize all of the second usage quota reservation and may need more resources. Accordingly, a request for additional resources may be automatically sent to the system associated with the telecommunications network. The system may again determine whether there are resources available from the shared quota. If there are resources available from the shared quota, an even smaller at least one second usage quota reservation out of the at least a portion of the shared quota may be allocated to the at least one first subscriber. In this way, a progressively smaller usage quota reservation may be recursively allocated to the at least one first subscriber.

In one embodiment, recursively allocating the progressively smaller second usage quota reservation out of the at least a portion of the shared quota to the at least one first subscriber among the plurality of network subscribers may include utilizing a step function to allocate smaller chunks of the at least a portion of the shared quota in response to one or more requests. The step function may include a variety of techniques.

For example, in one embodiment, the step function may allocate the smaller chunks of the at least a portion of the shared quota based on a number of devices that are sharing the shared quota. In another embodiment, the step function may allocate the smaller chunks of the at least a portion of the shared quota based on a percentage of the allocated first usage quota reservation. In yet another embodiment, the step function may allocate the smaller chunks of the at least a portion of the shared quota based on a fixed step down value.

Further, in one embodiment, the step function may allocate the smaller chunks of the at least a portion of the shared quota based on a constant value. Still yet, the step function may allocate the smaller chunks of the at least a portion of the shared quota based on a number of devices that are sharing the shared quota, a percentage of the allocated first usage quota reservation, a fixed step down value, and a constant value.

As an example, the first usage quota reservation may include a quotient of a percentage of the shared quota divided by a number of the plurality of network subscribers sharing the shared quota, multiplied by a constant value. In this case, the at least one second usage quota reservation may include a quotient of the first usage quota reservation divided by the number of the plurality of network subscribers sharing the shared quota, multiplied by the constant value. Further, in one embodiment, any subsequent allocation may include a quotient of the at least one second usage quota reservation divided by the number of the plurality of network subscribers sharing the shared quota, multiplied by the constant value.

Still yet, in one embodiment, the progressively smaller second usage quota reservation may be recursively allocated to the first subscriber until the shared quota reaches a predefined interim threshold. In this case, in one embodiment, the second usage quota reservation may be increased once the at least a portion of the shared quota passes the predefined interim threshold. The interim threshold may include any user defined threshold and may include a percentage of the total threshold or a specific amount, etc.

Further, in one embodiment, recursively allocating the progressively smaller second usage quota reservation may not necessary mean that each subsequent usage quota reservation will be smaller than the previous. This may depend on the actual implementation of the step-down function. In some cases, there may be a more gradual step down in the quota reservations. For example, a series of allocations of 100, 25, 25, 25, 12.5, 6.25, may be utilized. In this case, overall, the amount may get progressively smaller but not necessarily at each allocation.

In this way, the method 300 may be used not only when approaching exhaustion of quota, but also when approaching an interim threshold (e.g. 75% of the quota) so a system may react at the right time and as accurately as possible. Some examples in the interim case include sending an SMS alert about a remaining quota or applying a QoS reduction.

In operation, the method 300 may utilized such that a system may function to get as close as possible to the actual quota limit without going over the limit, without starving devices of quota, and minimizing the amount of signaling required.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
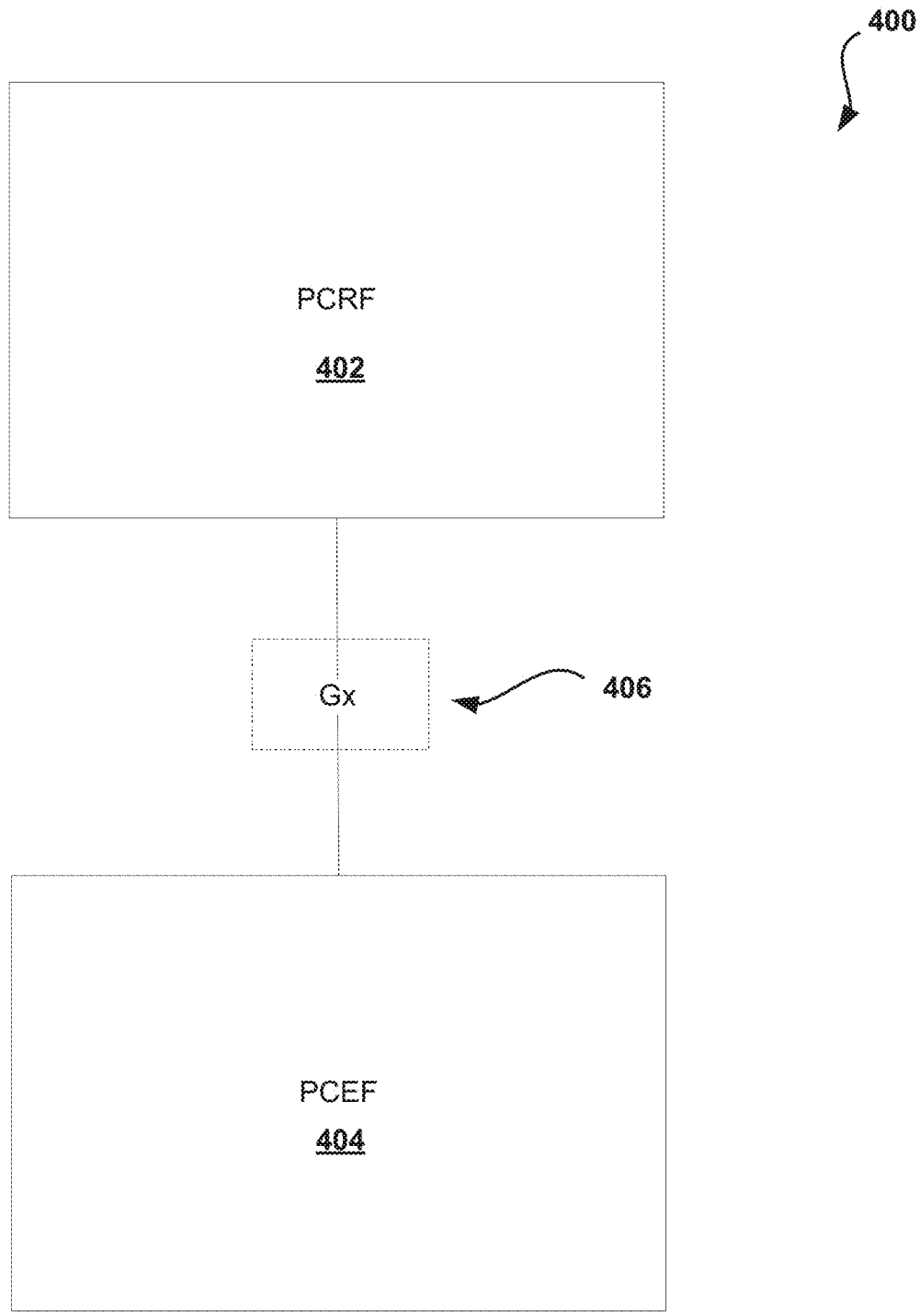
FIG. 4 illustrates a system for managing a shared quota for a plurality of network subscribers in a consumer telecommunications network, in accordance with one embodiment.

FIG. 4 illustrates a system 400 for managing a shared quota for a plurality of network subscribers in a consumer telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, FIG. 4 illustrates an interface 406 between a Policy and Charging Enforcement Function (PCEF) system 404 and PCRF 402 system in a 3GPP network architecture. In operation, the system 400 may function to allow multiple users/devices in a consumer telecommunications network to share a quota bucket of time and/or volume quota. The system 400 may function to allow quota to be reserved without allowing over-use of a total quota bucket, while minimizing starvation of the quota bucket when multiple users/devices access the bucket simultaneously.

In the context of the present description, the interface 406 may generally represent the interface between any telecommunications network gateway (such as 3GPP, GGSN or P-GW networks). Further, the systems 402 and 404 may generally represent policy (such as 3GPP PCRF, via the Gx interface, etc.) or charging (such as 3GPP OCS via the Gy interface, etc.) servers that use a quota reservation system (e.g. outlined in RFC 4006).

The 3GPP Gx and Gy protocols typically use a technique where, in a telecommunications network, usage quota (e.g. time or data volume, etc.) is provided by a policy charging and rules function (PCRF) or online charging system (OCS) to a network gateway in quota reservation chunks. Once a chunk of quota is consumed, the gateway requests additional reservations of chunks of quota until there is no more quota available for the counter in question. This quota reservation technique is based on RFC 4006, the Diameter Credit-Control Application, which is a networking protocol for diameter application used to implement real-time credit-control for a variety of end user services.

In a situation where there are multiple resources/devices that share the same quota counter, there are generally two techniques typically used for managing reservations by which an out of quota state can be reached for a counter.

The first technique includes allowing quota reservations to exceed the maximum value for the counter, and only reporting an over the counter limit when the usage report from the gateway shows the value has exceeded. This is the simplest reservation implementation but it allows usage to go over the maximum value for the counter, which may result in revenue leakage for the operator.

The second technique includes allowing only quota reservations up to the maximum value for the counter. Unfortunately, this may result in premature out of quota conditions where a device requests additional quota while the entire quota is reserved by other devices that have quota reservations, but once quota from those reservations is returned at the end of the session there may in fact still be quota available.

Accordingly, in one embodiment, the quota chunk size may be made smaller, such that there is a smaller margin for premature out of quota conditions. There is a direct correlation between smaller chunk sizes and increased signaling overhead. In addition, a large number of devices sharing the same quota may exacerbate this overhead.

In one embodiment, a single step down technique may be implemented, where a given reservation chunk size is repeatedly allocated until a final chunk remains. Thereafter, a minimum chunk size may be repeatedly allocated until quota is exhausted.

Furthermore, in one embodiment, the system 400 may operate to implement a dynamic function that dictates the step down of the quota chunk size, where the parameters of the function are configurable. For example, the parameters may include a size of the quota, and the number of devices sharing the quota, etc. This type of step down function allows the reservation chunk allocations to be as close as possible to the quota limit, preventing revenue loss and enables large numbers of devices to share a single quota.

Figure 5:
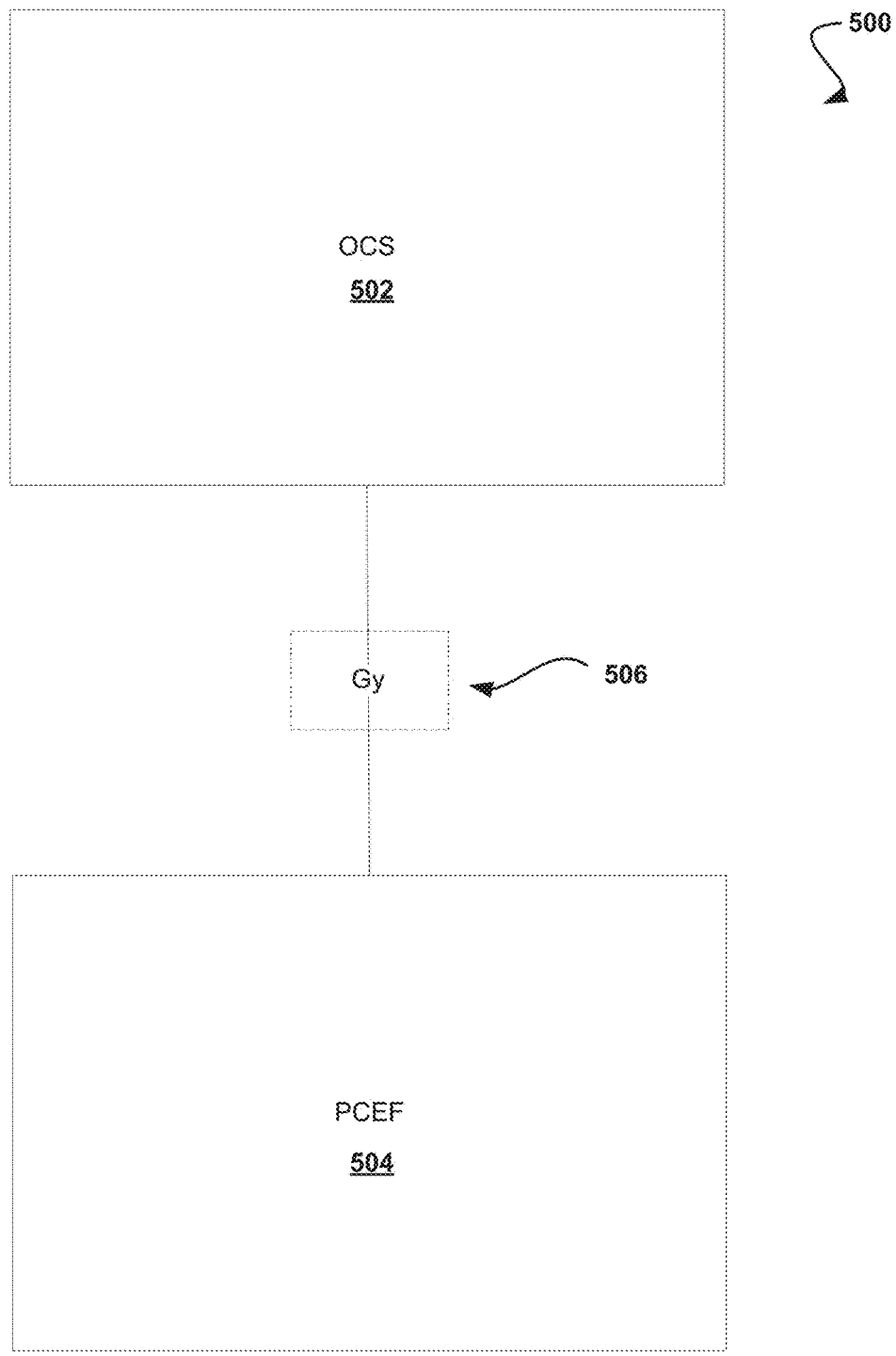
FIG. 5 illustrates a system for managing a shared quota for a plurality of network subscribers in a consumer telecommunications network, in accordance with another embodiment.

FIG. 5 illustrates a system 500 for managing a shared quota for a plurality of network subscribers in a consumer telecommunications network, in accordance with another embodiment. As an option, the system 500 may be implemented in the context of the details of FIGS. 1-4. Of course, however, the system 500 may be implemented in the context of any desired environment. Further, the aforementioned definitions may equally apply to the description below.

As shown, FIG. 5 illustrates an interface 506 between a PCEF system 504 and an OCS 502 system in a 3GPP network architecture. In operation, the system 500 may function to allow multiple users/devices in a consumer telecommunications network to share a quota bucket of time and/or volume quota. The system 500 may function to allow quota to be reserved without allowing over-use of a total quota bucket, while minimizing starvation of the quota bucket when multiple users/devices access the bucket simultaneously.

In use, the system 400 of FIG. 4, the system 500, and/or various other telecommunication systems may function to implement a method for managing a shared quota for a plurality of network subscribers. For example, in one embodiment, such systems may function to define a default quota chunk size. This chunk may be what is normally allocated by the system to a device requesting a quota. In various embodiments, the default chunk size may include a percentage of the total quota or a fixed size value (e.g. in MB), etc.

When the final default chunk size is reached, the system may not allocate it. Instead, the system may use a step function to hand out smaller chunks of quota as they are requested. In various embodiments, this step function may be based on a combination of the number of devices that are sharing the quota bucket, a percentage of the default chunk size, a fixed step down value, and/or constant value. In one embodiment, the step function may be configurable in the system.

Further, the systems may define a minimum chunk size (e.g. either as a percentage of the total quota or as a fixed size value, etc.). In one embodiment, when the initial step function reaches the minimum chunk size, the system may begin to allocate the minimum chunk size until the quota is exhausted.

This system may function such that it gets as close as possible to the actual quota limit without going over the limit, without starving devices of quota, and minimizing the amount of signaling required.

As an example of a step function, a 1000 MB quota bucket may exist in the network. Further, a default chunk size of 100 MB may be defined and minimum chunk size of 1 MB may be defined.

In this example, the step function may operate such that the size of an allocated chunk equals the size of the previous allocated chunk divided by the total number of users sharing the quota bucket multiplied by two. However, in this example, no chunks smaller than 1 MB may be allocated. For example, with 5 users sharing the bucket, the size of the first chunk will be 100 MB/5*2=40 MB, the size of the second chunk will be 40 MB/5*2=16 MB and so on, until reaching a chunk size of 1 MB.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program product including code adapted to be executed by a computer system to perform a method comprising:
    allocating, by the computer system, a first usage quota reservation out of a shared quota to one or more subscribers among a plurality of network subscribers;
    recursively allocating to the one or more subscribers, by the computer system, progressively smaller usage quota reservations out of a portion of the shared quota that is available, including:
        (a) determining an additional usage quota reservation that is a step-wise reduction from a last allocated usage quota reservation, the determining of the additional usage quota reservation being performed by applying a predefined mathematical function to the last allocated usage quota reservation;
        (b) determining whether the additional usage quota reservation is at least equal to a predefined minimum amount;
        (c) when it is determined in (b) that the additional usage quota reservation is at least equal to the predefined minimum amount, allocating the additional usage quota reservation from the shared quota to the one or more subscribers, and returning to (a);
        (d) when it is determined in (b) that the additional usage quota reservation is not at least equal to the predefined minimum amount, terminating the recursive allocating.

2. The non-transitory computer readable medium of claim 1, wherein the shared quota is reserved for the plurality of network subscribers.

3. The non-transitory computer readable medium of claim 1, wherein the shared quota includes at least one of a time usage quota associated with a telecommunications network or a data usage quota associated with the telecommunications network.

4. The non-transitory computer readable medium of claim 1, wherein the first usage quota reservation includes a percentage of the shared quota.

5. The non-transitory computer readable medium of claim 1, wherein the first usage quota reservation includes a fixed amount of the shared quota.

6. The non-transitory computer readable medium of claim 1, further comprising receiving a request for the additional usage quota reservation.

7. The non-transitory computer readable medium of claim 1, wherein the first usage quota reservation includes a quotient of a percentage of the shared quota divided by a number of the plurality of network subscribers sharing the shared quota, multiplied by a constant value.

8. The non-transitory computer readable medium of claim 1, wherein the plurality of network subscribers include subscribers to one of an Online Charging System (OCS) based network or a Policy and Charging Rules Function (PCRF) based network.

9. A method, comprising:
    allocating, by a computer system, a first usage quota reservation out of a shared quota to one or more subscribers among a plurality of network subscribers;
    recursively allocating to the one or more subscribers, by the computer system, progressively smaller usage quota reservations out of a portion of the shared quota that is available, including:
        (a) determining an additional usage quota reservation that is a step-wise reduction from a last allocated usage quota reservation, the determining of the additional usage quota reservation being performed by applying a predefined mathematical function to the last allocated usage quota reservation;
        (b) determining whether the additional usage quota reservation is at least equal to a predefined minimum amount;
        (c) when it is determined in (b) that the additional usage quota reservation is at least equal to the predefined minimum amount, allocating the additional usage quota reservation from the shared quota to the one or more subscribers, and returning to (a);
        (d) when it is determined in (b) that the additional usage quota reservation is not at least equal to the predefined minimum amount, terminating the recursive allocating.

10. A computer system comprising:
    a memory system; and
    one or more processing cores coupled to the memory system and that are each configured to:
        allocate, by the computer system, a first usage quota reservation out of a shared quota to one or more subscribers among a plurality of network subscribers;
        recursively allocate to the one or more subscribers, by the computer system, progressively smaller usage quota reservations out of a portion of the shared quota that is available, including:
            (a) determining an additional usage quota reservation that is a step-wise reduction from a last allocated usage quota reservation, the determining of the additional usage quota reservation being performed by applying a predefined mathematical function to the last allocated usage quota reservation;

(b) determining whether the additional usage quota reservation is at least equal to a predefined minimum amount;

(c) when it is determined in (b) that the additional usage quota reservation is at least equal to the predefined minimum amount, allocating the additional usage quota reservation from the shared quota to the one or more subscribers, and returning to (a);

(d) when it is determined in (b) that the additional usage quota reservation is not at least equal to the predefined minimum amount, terminating the recursive allocating.

11. The non-transitory computer readable medium of claim 1, wherein the step-wise reduction is a percentage reduction from the last allocated usage quota reservation.

12. The non-transitory computer readable medium of claim 1, wherein the step-wise reduction is a fixed value reduction from the last allocated usage quota reservation.

* * * * *